United States Patent [19]

Redfern

[11] Patent Number: 4,792,733
[45] Date of Patent: Dec. 20, 1988

[54] CATHODE RAY TUBE DISPLAY ARRANGEMENTS

[75] Inventor: Martin W. Redfern, Maidstone, England

[73] Assignee: GEC Avionics Limited, England

[21] Appl. No.: 15,921

[22] Filed: Feb. 18, 1987

[30] Foreign Application Priority Data

Feb. 28, 1986 [GB] United Kingdom ............... 8605030

[51] Int. Cl.⁴ .................................. H01J 29/52
[52] U.S. Cl. ............................ 315/386; 315/401; 358/220
[58] Field of Search ........... 315/383, 384, 386, 401; 358/220

[56] References Cited

U.S. PATENT DOCUMENTS 4,338,623 7/1982 Asmus et al. .............. 358/220

Primary Examiner—Theodore M. Blum
Attorney, Agent, or Firm—Kirschstein, Kirschstein, Ottinger & Israel

[57] ABSTRACT

A cathode ray tube (CRT) display arrangement including protection means for protecting the screen of the CRT (1) against excessive heating, by the electron beam, e.g. due to failure of the beam deflection drive circuits (5), the protection means comprising an electronic storage means (27 to 41) having storage locations in which are stored values indicative of the temperature at different locations on the CRT screen, and means (7) for controlling the electron beam current in dependence on the contents of the storage means.

12 Claims, 2 Drawing Sheets

CATHODE RAY TUBE DISPLAY ARRANGEMENTS

This invention relates to cathode ray tube (CRT) display arrangements.

In CRT display arrangements, more especially such arrangements using high brightness CRTs, if any part of the CRT screen is excessively exposed to the electron beam due to the CRT spot remaining stationary, moving very slowly, or scanning the same path on the screen very frequently, the screen luminescent material may be permanently damaged. In high brightness CRTs, for example, where the electron beam power density is typically of the order of tens of megawatts per square metre, the luminescent material can be evaporated by a stationary spot in tens of microseconds.

To reduce this problem such display arrangements sometimes incorporate deflection failure detectors which determine whether the rate of change of the vector sum of the movements of the CRT spot in X and Y directions is above a minimum value. If the rate falls below the minimum value the CRT electron beam temporarily is blanked, e.g. until the rate rises again above the minimum level.

Such detectors suffer from the disadvantage that they do not detect when the CRT spot is scanning so frequently along the same path on a CRT screen as to give a cumulative overload.

It is an object of the present invention to provide a CRT display arrangement wherein this problem is overcome.

The present invention provides a CRT display arrangement comprising: a CRT; deflection means for deflecting an electron beam produced by an electron gun of the CRT across the display screen of the CRT; electronic storage means having a respective storage location for each of a plurality of discrete portions of the display area of the CRT screen; means for storing in each said storage location a value indicative of the temperature in the corresponding portion of said display area due to impact thereon of said electron beam; and means for controlling the electron beam in dependence on the contents of said storage means so as to prevent excessive heating of a said portion of the display screen.

In one particular arrangement according to the invention said means for storing comprises: means for producing at intervals an output signal indicative of the particular said portion of said display screen onto which said electron beam is currently directed; means responsive to each said output signal for increasing by an amount dependent on the electron beam current the value stored in the storage location corresponding to the particular said portion to which that output signal relates; and means for reducing at intervals the value stored in each said storage location by an amount representative of the heat dissipation from the portion of the display area corresponding to that storage location; and said means for controlling is responsive to the value stored in a location of the storage means exceeding a predetermined value.

In such an arrangement said means for producing an output signal preferably operates in response to signals derived from said deflection means of the arrangement.

Said means for reducing suitably comprises means for reducing the value stored in each said storage location by a predetermined fraction. Said predetermined fraction is suitably half.

One CRT display arrangement in accordance with the invention will now be described, by way of example, with reference to the accompanying drawings in which.

Figure 1:
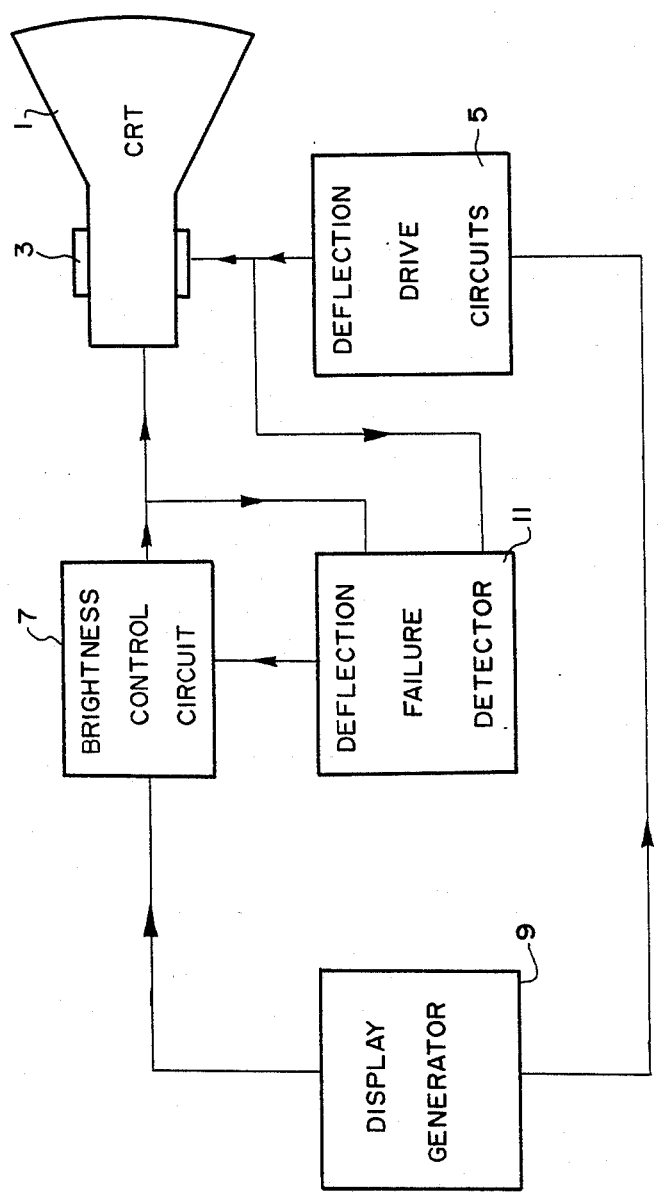
FIG. 1 is a block schematic diagram of the arrangement.

Referring to FIG. 1, the arrangeent includes a CRT 1. The CRT 1 has a deflection coil arrangement 3 which is supplied with X and Y direction drive signals by deflection drive circuits 5. The electron beam current of the CRT is controlled by a brightness control circuit 7. The circuit 7 serves to turn the electron beam on or off only, as required. Thus the display on the CRT screen exhibits only one brightness level.

A display generator 9 applies brightness control and deflection signals to the circuits 7 and 5 respectively in accordance with the image required to be displayed on the CRT screen.

The electron beam current of the CRT is further controlled in dependence on a signal applied to the brightness control circuit 7 by CRT screen protection circuits 11 which operate in response to the output signals of the deflection drive circuits 5 and the brightness control circuit 7 in a manner to be described below.

It will be appreciated that, apart from the screen protection circuits 11, the arrangement is entirely conventional. It will be understood that the arrangement may be arranged to operate in a raster scanning and/or a stroke writing mode.

The screen protection circuits 11 serve to create a thermal model of the CRT screen and to blank off the CRT beam if the temperature at any part of the screen, as represented by the model, becomes excessively high.

To this end the circuits 11 incorporate a digital memory means in which a number is stored in respect of each pixel of the CRT screen. Each stored number is increased by a predetermined amount each time the beam impinges on the corresponding pixel for a predetermined time, to represent the heat generated at each pixel location, and each stored number is decreased periodically to represent the dissipation of heat from the corresponding pixel.

Figure 2:
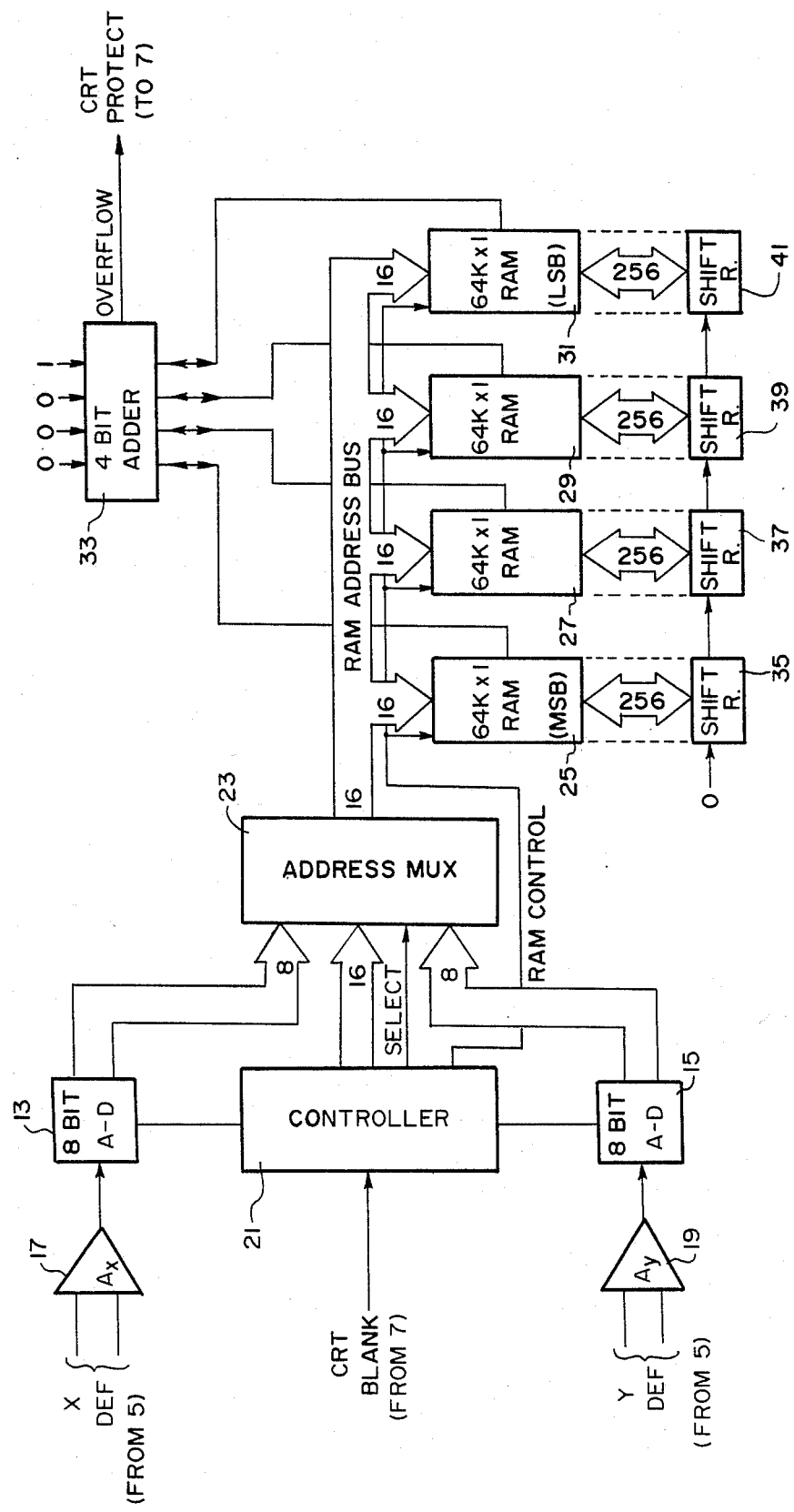
FIG. 2 is a block schematic diagram showing part of the arrangement of FIG. 1 in greater detail.

Referring now to FIG. 2, the circuits 11 include two eight bit analogue-to-digital (A-D) converters 13 and 15 to whose inputs analogue signals respectively representative of the X and Y direction deflection currents in the CRT deflection coils 3 are respectively applied via amplifiers 17 and 19.

The A-D converters 13 and 15 operate under the control of signals derived from a controller circuit 21 to produce at regular intervals, typically at one microsecond intervals, eight-bit digital signals respectively representative of the X and Y co-ordinates of the position at which the electron beam is currently impinging on the CRT screen.

The A-D converters 13 and 15 are suitably of the adaptive tracking type. Essentially an adaptive tracking A-D converter comprises: a counter, whose count constitutes the output of the converter; a digital-to-analogue converter responsive to the output of the counter; a comparator which compares the output of the D-A converter with the input signal; and a logic circuit which changes the count of the counter by a predetermined amount (the tracking step) in response to the comparator output in accordance with a predetermined strategy set by the logic circuit. With such an arrangement, the logic circuit can be arranged to increase the tracking step for successive digital outputs of A-D converter 13 or 15 with increase of the deflection rate of the electron beam across the CRT screen so as to keep pace with fast CRT beam deflection slews.

Instead of adaptive tracking type converters, flash type converters may suitably be used for the A-D converters 13 and 15.

It will be appreciated that, in the example being described, the position of the electron beam on the CRT screen is indicated by the outputs of the A-D converters 13 and 15 with a 256×256 pixel resolution.

The digital outputs of the A-D converters 13 and 15 are applied to an address multiplexer 23 where they are combined under control of the controller circuit 21 to produce a sixteen-bit output representative of the current position of the electron beam on the CRT screen.

The output of the address multiplexer 23 is used to address each of four 64 K×1 random access memory (RAM) circuits 25, 27, 29 and 31 of the video RAM type, as is further explained below.

The RAMs 25 to 31 are associated with a four bit adder 33.

The RAMs 25 to 31 are used to store a representation of the temperature of each of the 256×256 pixels of the CRT screen. To this end each RAM stores, in respect of each pixel, a different bit of a four-bit number. The RAM 25 stores the most significant bit (MSB) of each four bit number, the RAM 27, the next less significant bit, the RAM 29 the next less significant bit and the RAM 31 the least significant bit (LSB).

In operation, following the appearance of each sixteen-bit positional address at the output of the address multiplexer 23 under control of signals from the controller 21, if the electron beam is currently turned on, the four bits stored in the RAMs which relate to the CRT screen pixel which the sixteen bit address represents are read into the adder 33. The number in the adder 33 is then increased by one and the four bits of the resulting number written back into the RAMs. Thus the number stored in the RAMs in respect of each pixel of the CRT screen is increased by one each time the CRT beam impinges on that pixel for a time equal to the period between successive sixteen-bit outputs of the multiplexer, i.e. the digitising time interval.

To take account of heat dissipation from the CRT screen the four-bit number stored in the RAMs 25 to 31 in respect of each pixel is halved periodically. This is carried out as follows, for 256 pixels at a time, using 256 bit shift registers 35, 37, 39 and 41 incorporated in the RAMs 25 to 31, the shift registers being connected in series.

Under control of the controller 21, the bits in each, RAM 25, 27, 29 or 31 for a block of 256 pixels are first written into the shift register 35, 37, 39 or 41 associated with that RAM. The registers 35 to 41 are then clocked 256 times, thus transferring the 256 bit block in each register 35, 37 or 39 into the register of the RAM which stores the next less significant bits of the four-bit numbers, i.e. into the adjacent right-hand register in FIG. 2, and discarding the original least significant bits in register 41. At the same time 256 zeros are clocked into the register 35 of the most significant bit RAM 25.

The bits now in the registers 35, 37, 39 and 41 are then written back into the RAMs 25, 27, 29 and 31 respectively, at the same addresses as the bits first written into the registers were derived from. The four-bit numbers stored in the RAMs 25 to 31 in respect of the 256 pixels are thus all halved.

It will be appreciated that this process is carried out for all 256 blocks of 256 pixels on a regular basis at intervals substantially equal to the time which it takes to dissipate half the heat energy generated in a pixel by the electron beam, e.g. every few milliseconds. The process is, of course, carried out in intervals between the increases in the numbers stored in the RAMs 25 to 31 in respect of each sixteen-bit positional address at the output of the address multiplexer 23.

It will be noted that the process incidentally provides dynamic refresh of the data stored in the RAMs 25 to 31.

It will be understood that the four bit numbers stored in the RAMs 25 to 31 are thus indicative of the temperatures in the 256×256 pixels of the CRT screen.

Prevention of the temperature of any pixel reaching an excessively high value is achieved as follows.

If the number in the adder 33 overflows when increased by one, i.e. exceeds fifteen, the overflow is detected by the brightness control circuit 7 and the CRT beam temporarily turned off. The beam may be arranged to remain turned off until the beam moves to another pixel for which no overflow would occur in the adder 33, i.e. no overheating would occur, if the beam were switched on. Alternatively the beam may remain turned off until the four bit number which has exceeded fifteen is halved, as described above. A third possibility is for the beam to remain turned off until the the passage of a predetermined period of time, which may be the period required for a full 256×256 pixel deflection cycle, in which no overflow in the adder 33 would occur if the beam were switched on.

In a modification of the arrangement described by way of example wherein the brightness of the CRT display is controllable over a range of brightness levels, the number by which the number in the adder 33 is increased before being written back into the RAMs 25 to 31 varies in dependence on the value of the beam current, i.e. brightness level. In other arrangements, the strategy employed for reducing the four bit numbers may be more sophisticated than simply halving the numbers i.e. comprise a series reductions of different amounts to model non-linear heat dissipation.

I claim:

1. A CRT display arrangement comprising: a CRT; deflection means for deflecting an electron beam produced by an electron gun of the CRT across a display screen of the CRT; electronic storage means having a respective storage location for each of a plurality of discrete portions of a display area of the CRT screen; means for storing in each said storage location a value indicative of the temperature in the corresponding portion of said display area due to impact thereon of said electron beam; and means for controlling the electron beam in dependence on the contents of said storage means so as to prevent excessive heating of a said portion of the display screen.

2. An arrangement according to claim 1 wherein said means for storing comprises: means for producing at intervals an output signal indicative of the particular said portion of said display screen onto which said electron beam is currently directed; means responsive to each said output signal for increasing by an amount dependent on the electron beam current the value stored in the storage location corresponding to the particular said portion to which that output signal relates;

and means for reducing at intervals the value stored in each said storage location by an amount representative of the heat dissipation from the portion of the display area corresponding to that storage location; and said means for controlling is responsive to the value stored in a location of the storage means exceeding a predetermined value.

3. An arrangeaent according to claim 2 wherein said means for producing an output signal operates in response to signals derived from said deflection means of the arrangement.

4. An arrangement according to claim 3 wherein said means for producing an output signal comprises an adaptive tracking analogue to digital converter means whose tracking step varies in dependence on the deflection rate of the electron beam across said display screen.

5. An arrangement according to claim 2 wherein said means for reducing comprises means for reducing the value stored in each said storage location by a predetermined fraction.

6. An arrangement according to claim 5 wherein said predetermined fraction is half.

7. An arrangement according to claim 2 wherein said electronic storage means comprises: a binary digital store which stores a respective n-bit number in each said storage location; said means for increasing comprises: an n-bit adder; means for writing the n-bit number in the storage location corresponding to the particular said portion into said adder, increasing the number in said adder by said amount, and then writing the number in said adder back into said storage location; and said means for controlling operates in response to the number in said adder exceeding a predetermined value.

8. An arrangement according to claim 7 wherein said digital store comprises: a store having n-sections each of which sections stores a respective corresponding bit of each said n-bit number; and said means for reducing comprises a shift register arrangement whereby the bits in the store section storing the least significant bits of said n-bit number are discarded, the bits in each other store section are transferred to the store section which stores the next less significant bit of each n-bit number, and the bits in the section storing the most significant bit of each n-bit number are all converted to zeros.

9. An arrangement according to claim 1 wherein said means for controlling monitors in turn the value stored in each said storage location and temporarily turns off the electron beam when the contents of a said storage location exceeds a predetermined value.

10. An arrangement according to claim 9 wherein said electron beam is turned off until the beam moves to a said portion of the screen where excessive heating would not occur if the beam were on.

11. An arrangement according to claim 9 wherein said electron beam is turned off until a predetermined time has passed in which excessive heating would not occur in any of said portions of the display screen if the electron beam were on.

12. An arrangement according to claim 2 wherein said means for controlling monitors in turn the value stored in each said storage location and turns off the electron beam when the contents of a said storage location exceeds a predetermined value until said means for reducing is next operative.

* * * * *